United States Patent [19]

Kaczur et al.

[11] Patent Number: 4,781,852

[45] Date of Patent: Nov. 1, 1988

[54] PROCESS FOR MAKING SELECTED DOPED BARIUM AND STRONTIUM HEXAFERRITE PARTICLES

[75] Inventors: Jerry J. Kaczur, Cleveland, Tenn.; J. Paul Deininger, Los Alamos, N. Mex.; Larry D. Carpenter, Cleveland, Tenn.

[73] Assignee: Olin Corporation, Cheshire, Conn.

[21] Appl. No.: 923,063

[22] Filed: Oct. 24, 1986

[51] Int. Cl.$^4$ ............... C01G 49/08; C04B 35/26; C04B 35/64; H01F 1/00

[52] U.S. Cl. ............... 252/62.59; 256/62.56; 256/62.6; 256/62.62; 256/62.63

[58] Field of Search ............... 252/62.56, 62.59, 62.62, 252/62.63, 62.6; 423/594; 427/127, 128, 215; 428/403, 694, 900

[56] References Cited

U.S. PATENT DOCUMENTS

| | | | |
|---|---|---|---|
| 3,582,266 | 6/1971 | Sopp et al. | 23/51 |
| 3,634,254 | 1/1972 | Micheli | 252/62.63 |
| 3,770,639 | 11/1973 | Okazaki et al. | 252/62.57 |
| 3,793,443 | 2/1974 | Arendt | 423/594 |
| 3,810,973 | 5/1974 | Arendt et al. | 423/594 |

(List continued on next page.)

FOREIGN PATENT DOCUMENTS

| | | |
|---|---|---|
| 95191A2 | 5/1983 | European Pat. Off. |
| 95070A2 | 11/1983 | European Pat. Off. |
| 102819 | 3/1984 | European Pat. Off. |
| 3405602A1 | 2/1984 | Fed. Rep. of Germany |
| 58-2224 | 1/1983 | Japan |
| 58-2223 | 1/1983 | Japan |
| 196709 | 9/1986 | Japan |
| 199674 | 9/1986 | Japan |
| 71644 | 9/1980 | Romania |

OTHER PUBLICATIONS

Haneda, Koichi, Choji Miyakawa, and Hiroshi Kojima, "Preparation of High Coercivity BaFe$_{12}$O$_{19}$", Journal American Ceramic Society, 57, 354–357, (1974).
Kubo, O., T. Ido and H. Yokoyama, IEEE Trans. on Magnetics, vol. Mag. 18, Nov. 1982.

Symposium on Magnetic Media Manufacturing Proceeding Textbook, May, 1983.
Takada, Toshio and Kiyma, Masao, "Proparation of Ferrites by Wet Method", Ferrites, *Proceedings of the International Conference*, Jul., 1970, Japan.
Goldman, A. and Laing, A. M., "A New Process for Co-precipitation of Ferrites", *Journal de Physiquie, Colloque Cl*, supplement No. 4, Tome 38, Apr. 1977, pp. C1-297.

*Primary Examiner*—Michael R. Lusignan
*Attorney, Agent, or Firm*—William A. Simons

[57] ABSTRACT

A process for preparing doped barium and strontium hexaferrite compounds having the formula (I):

$$AFe_{12-r-s}M_rN_sO_{19} \qquad (I)$$

wherein A is barium or strontium; M is cobalt, zinc, nickel; N is titanium or ruthenium and r and s are individually in the range from about 0.1 to about 1.2, said process comprising:
(a) forming particles of a doped Fe$_3$O$_4$/ACO$_3$ co-precipitate wherein A is defined above from (i) a ferric compound, (ii) a ferrous compound, (iii) a barium or strontium compound, (iv) a cobalt, zinc or nickel compound, (v) a titanium or ruthenium compound and (vi) alkali metal carbonate;
(b) suspending the doped Fe$_3$O$_4$/ACO$_3$ particles in a concentrated aqueous solution of an alkali halide;
(c) spray drying said suspension to form a dried powder comprising said doped Fe$_3$O$_4$/ACO$_3$ particles distributed onto the surfaces of the high temperature-melting alkali halide crystals;
(d) calcining said dried powder at a temperature from about 700° C. to about 900° C. to convert said Fe$_3$O$_4$/ACO$_3$ solids into doped barium hexaferrite particles having formula (I) and an average particle size from about 0.01 to about 0.3 microns; and
(e) recovering said doped hexaferrite particles from said alkali halide.

34 Claims, 1 Drawing Sheet

U.S. PATENT DOCUMENTS

| | | | |
|---|---|---|---|
| 4,584,242 | 4/1986 | Nagai et al. | 428/403 |
| 4,585,568 | 4/1986 | Nagai et al. | 252/62.59 |
| 4,664,831 | 5/1987 | Hibst et al. | 252/62.59 |
| 4,025,449 | 5/1977 | Pezzoli et al. | 252/62.63 |
| 4,116,752 | 9/1978 | Matsumoto et al. | 156/624 |
| 4,120,806 | 10/1978 | Wantanabe et al. | 252/62.54 |
| 4,120,807 | 10/1978 | Wantanabe et al. | 252/62.62 |
| 4,259,197 | 3/1981 | Boeuf et al. | 252/62.58 |
| 4,279,763 | 7/1981 | Boeuf et al. | 252/62.58 |
| 4,336,242 | 6/1982 | Schmidberger et al. | 423/594 |
| 4,341,648 | 7/1982 | Kubo et al. | 252/62.58 |
| 4,372,865 | 2/1983 | Yu et al. | 252/62.62 |
| 4,401,643 | 8/1983 | Hibst et al. | 423/594 |
| 4,414,124 | 11/1983 | Endo et al. | 252/62.63 |
| 4,425,250 | 1/1984 | Hibst | 252/62.59 |
| 4,425,401 | 1/1984 | Ido et al. | 428/329 |
| 4,440,713 | 4/1984 | Rigby | 264/325 |
| 4,512,906 | 4/1985 | Hayakawa et al. | 252/62.63 |
| 4,529,524 | 7/1985 | Nagai et al. | 252/62.59 |
| 4,539,129 | 9/1985 | Nagai et al. | 252/62.63 |
| 4,543,198 | 8/1985 | Kamiyama | 252/62.59 |
| 4,548,801 | 10/1985 | Nagai et al. | 423/594 |
| 4,561,988 | 12/1985 | Nagai et al. | 252/62.59 |

PROCESS FOR MAKING SELECTED DOPED BARIUM AND STRONTIUM HEXAFERRITE PARTICLES

BACKGROUND OF THE INVENTION

1. Field of the Invention

The present invention relates to an improved process for making selected doped barium and strontium hexaferrite particles of the formula (I):

$$AFe_{12-r-s}M_rN_sO_{19} \quad (I)$$

wherein A is barium or strontium; M is cobalt, zinc or nickel; N is titanium or ruthenium and r and s are individually selected from about 0.1 to about 1.2.

2. Brief Description of the Prior Art

Doped barium and strontium hexaferrite particles may be used in a wide variety of magnetic recording media (e.g. audio tape, video tape, computer tape and computer disks). It is believed that these particles are especially suitable for high density recording media (i.e. where high density information storage is required). To be acceptable for these applications, the hexaferrite particles must possess a certain combination of physical and chemical characteristics. The important product parameters currently looked at by workers in this technical area include the following:

(a) average particle size
(b) particle size distribution
(c) particle shape (i.e. aspect ratio)
(d) specific surface area ($m^2$/gm)(BET)
(e) specific magnetization ($\delta_s$)
(f) remanence magnetization ($B_r$)
(g) particle coercivity ($H_c$)
(h) type and amount of dopants While these specific product parameters may be different for individual end uses, each generally must be within an acceptable range for most recording applications.

For example, the average particle diameters are generally desired for most recording applications in the range of from about 0.01 to about 0.3 microns. Particles having an average diameter over about 0.3 microns are difficult to uniformly disperse on a magnetic recording substrate. Particles below about 0.01 micron diameter do not possess the desired ferromagnetic properties. For high density type recording media, it has been found that average particle diameters in the range from about 0.03 to 0.1 microns are especially preferred.

In addition, the particle size distribution should be as narrow as possible to obtain good uniform dispersibility on the recording substrate. If the particles sizes vary over a wide range, the resulting dispersed film of particles on the recording substrate will be uneven. It would be particularly advantageous that at least 95 percent of all of the particles, more preferably, at least 99%, be in a range from about 0.01 to about 0.2 microns.

It is also desired for most recording applications that the doped hexaferrite particles be platelet in shape. This means that the diameter/thickness ratio (i.e. ratio of the average diameter of the c-plane of the crystal of the particles to the thickness of the c-axial direction of the crystals) is in the range from about 2:1 to about 10:1. This diameter/thickness ratio is also known as the aspect ratio. Particles having lower aspect ratios (e.g. 2:1 to 4:1) have higher packing densities in magnetic media (i.e. more particles per unit volume). Particles having higher aspect ratios (e.g. 8:1 to 10:1) may be more easily oriented in the longitudinal plane of the recording media. However, high aspect ratio particles may have problems where smoothness of the surface of the recording media is important.

Generally, particle surface areas are dependent upon the combination of the average particle size, the size distribution and the aspect ratio. Specific surface areas (BET) in the range from about 15 $m^2$/gram to 42 $m^2$/gram are usually desired for high density magnetic recording.

Furthermore, it is generally desirable that the Particles have a specific magnetization ($\delta_s$) of at least about 45 "emu/g". in a magnetic field of 10K Oe. When the specific magnetization values are below about 45 emu/g, the signal output is significantly reduced in the magnetic recording media. For most high density magnetic recording media applications, specific magnetization ($\delta_s$) values of at least about 50 emu/g in a magnetic field of 10K Oe are generally suitable.

Acceptable remanence magnetization ($B_r$) values of the particles are generally in the range from about 18–40 emu/g in a magnetic field of 10K Oe. If the $B_r$ values of the particles are too low, the signal output of the resulting media may not be strong enough for recording purposes.

It is also generally desirable for most recording applications that the coercive force of the hexaferrite particles in the magnetic recording media should be in the range from about 200 to about 1500 Oe. For most high density recording applications, this range is suitable in the range from about 400 to about 1100 Oe. It is known that the partial replacement of iron atoms in the ferrite crystalline structure with selected dopants will lower the coercive force from unacceptably high levels (e.g., about 3000 Oe or higher) to these desired levels. However, the use of these dopants in too large quantities may also lower the specific magnetization levels to below the above-noted acceptable levels.

It has been found that certain pairs of dopants provide acceptable lowering of the coercive force of the hexaferrite particles. Cobalt and titanium are the most widely used dopant pair. When this dopant pair has been used, generally about 0.6–1.0 moles of each are used to replace iron atoms per mole of hexaferrite.

Several processes for making undoped or doped barium or strontium hexaferrite particles are known. One method is the ceramic or "dry" method. In this method, barium or strontium oxide and iron (III) oxide (with or without dopants) are mixed in the desired mole ratio, and the mixture heated to a high temperature (e.g., at least 1000° C.) to form a spinel or hexagonal barium or strontium ferrite. See U.S. Pat. No. 4,425,250. The formed particles have an average particle diameter of several microns. These relatively large particles are then extensively milled (e.g. ball milling or grinding) to obtain an acceptable average particle size. However, this milling process results in an unacceptable broad particle size distribution, which may cause a non-uniform dispersibility on the magnetic recording media and high noise levels in the end use recording products. Furthermore, it has also been reported that the milling produces crystal defects in the particles, creating poor magnetization properties and high noise characteristics. Still further, it is not easy to remove impurities already present or formed during this dry process.

Another method is the glass melt or crystallization process wherein iron particles and barium or strontium carbonate are mixed (with or without dopants) and melted in a glass forming chemical, for example, one containing sodium tetraborate. The glass is then cooled and calcined between 700° C. and 1100° C. See U.S. Pat. Nos. 4,279,763; 4,341,648; and 4,543,198. The glassy substance prevents the ferrite particles from sintering during the calcination process. The glassy substance is then removed by acid washing (e.g. acetic acid) and the hexaferrite product is then recovered. This process is relatively expensive to run because of the need for large amounts of glass-forming chemicals, the high temperatures used for making the glass melt and the need for special equipment and materials of construction (e.g. platinum). Furthermore, this process requires the extensive handling and recycling of large amounts of glass-forming compounds. Still further, the reaction of the acid with the glassy substance in the acid washing step may result in a residue in the hexaferrite particles, which may interfere with other constituents in the end products (e.g. polyethylene binders).

Still another method of making these particles is the autoclaving or hydrothermal process. In this process, $Fe(OH)_3$ or other iron compounds, a barium or strontium compound, and with or without dopants such as a cobalt compound and a titanium compound are autoclaved in an aqueous alkaline suspension at 250° C. to about 400° C. to produce precipitated barium hexaferrite particles. See U.S. Pat. Nos. 4,512,906; 4,529,524; 4,539,129; 4,548,801; 4,561,988 and 4,585,568. The particles produced from the autoclave reactor generally have undesirably low specific magnetization ($\delta_s$) values (e.g. 30–45 emu/g on a magnetic field of 10K Oe). Thus, for high density magnetic recording media applications, these particles require further processing (e.g. calcination and milling). This further processing increases the cost of making the particles and the milling may be harmful to the particle crystals for the reasons stated above.

Co-precipitation processes have also been employed to prepare barium and strontium hexaferrites. Such processes normally comprise first admixing in an aqueous alkaline suspension barium or strontium ions, iron ions, hydroxide ions, and carbonate ions (with or without dopants) to produce an iron oxide or an iron hydroxide and a barium or strontium carbonate co-precipitate, separating the co-precipitate from the reaction mixture, washing, spray drying, and then calcining the co-precipitate at selected high temperatures to form crystalline barium or strontium hexaferrite particles. See U.S. Pat. Nos. 4,120,807 and 4,440,713. However, it has been reported that these co-precipitate processes have several disadvantages. One is that the co-precipitates produced generally have a very small average diameter (i.e., less than 0.05 micron), which makes the particles very difficult to separate from the reaction mixture. This may also result in a lengthy separation time. A further disadvantage arises when filtration is used as the separation technique. Some of the very small barium or strontium carbonate portions of the co-precipitated particle may pass through the filter, thus undesirably altering the mole ratio of the barium or strontium hexaferrite compound. Still another disadvantage may arise during the calcination step. The particles may combine or fuse or sinter together during this heating step to form unacceptably large particles of one or more microns in diameter. These unacceptably large particles require milling and the above-described problems associated with milling may occur here.

One other known process for making barium or strontium hexaferrite particles is the "salt flux" or "salt melt" process. In this process, a mixture of a barium or strontium compound and an iron compound are first mixed together in a salt (e.g. BaCl, NaCl). The mixture is then dried (e.g. by spray drying) and calcined at or above the melt point of the salt to form hexaferrite particles in the salt melt. The salt is then dissolved and separated from the hexaferrite particles. See U.S. Pat. Nos. 3,793,443; 3,810,973 and 4,116,752. However, this process is the "dry" method in that it generally produces particles which are too large (i.e. above 0.5 microns) for use in high density magnetic recording media.

All of the above-noted U.S. Patents are incorporated herein by reference in their entireties.

In spite of all of these prior art processes for making undoped and doped barium and strontium hexaferrite particles, there is still a need for a better and more inexpensive process which is able to produce particles having product parameters above-noted general ranges, yet is flexible enough to obtain desired specific physical and chemical parameters needed for individual end uses without the problems associated with the known prior art processes. The present invention is believed to meet that need.

BRIEF SUMMARY OF THE PRESENT INVENTION

The present invention, therefore is directed to making a process for preparing doped barium and strontium hexaferrite compounds having the formula (I):

$$AFe_{12-r-s}M_rN_sO_{19} \tag{I}$$

wherein A is barium or strontium; M is cobalt, zinc, or nickel; N is titanium or ruthenium and r and s are individually selected from about 0.1 to about 1.2, said process comprising:

(a) forming particles of a doped $Fe_3O_4/ACO_3$ co-precipitate wherein A is defined above from (i) a ferric compound, (ii) a ferrous compound, (iii) a barium or strontium compound, (iv) a cobalt, zinc or nickel compound, (v) a titanium or ruthenium compound and (vi) an alkali metal carbonate and, optionally, an alkali metal hydroxide;

(b) suspending the doped $Fe_3O_4/ACO_3$ particles in a concentrated aqueous alkali halide solution.

(c) spray drying said suspensing to form a dried powder comprising said doped $Fe_3O_4/ACO_3$ particles distributed onto the surfaces of the high temperature-melting alkali halide crystals;

(d) calcining said dried powder at a temperature from about 700° C. to about 900° C. convert said $Fe_3O_4/ACO_3$ particles into doped barium hexaferrite particles having formula (I) and an average particle size from about 0.01 to about 0.3 microns; and (e) recovering said doped hexaferrite particles from said alkali halide.

DETAILED DESCRIPTION

Figure 1:
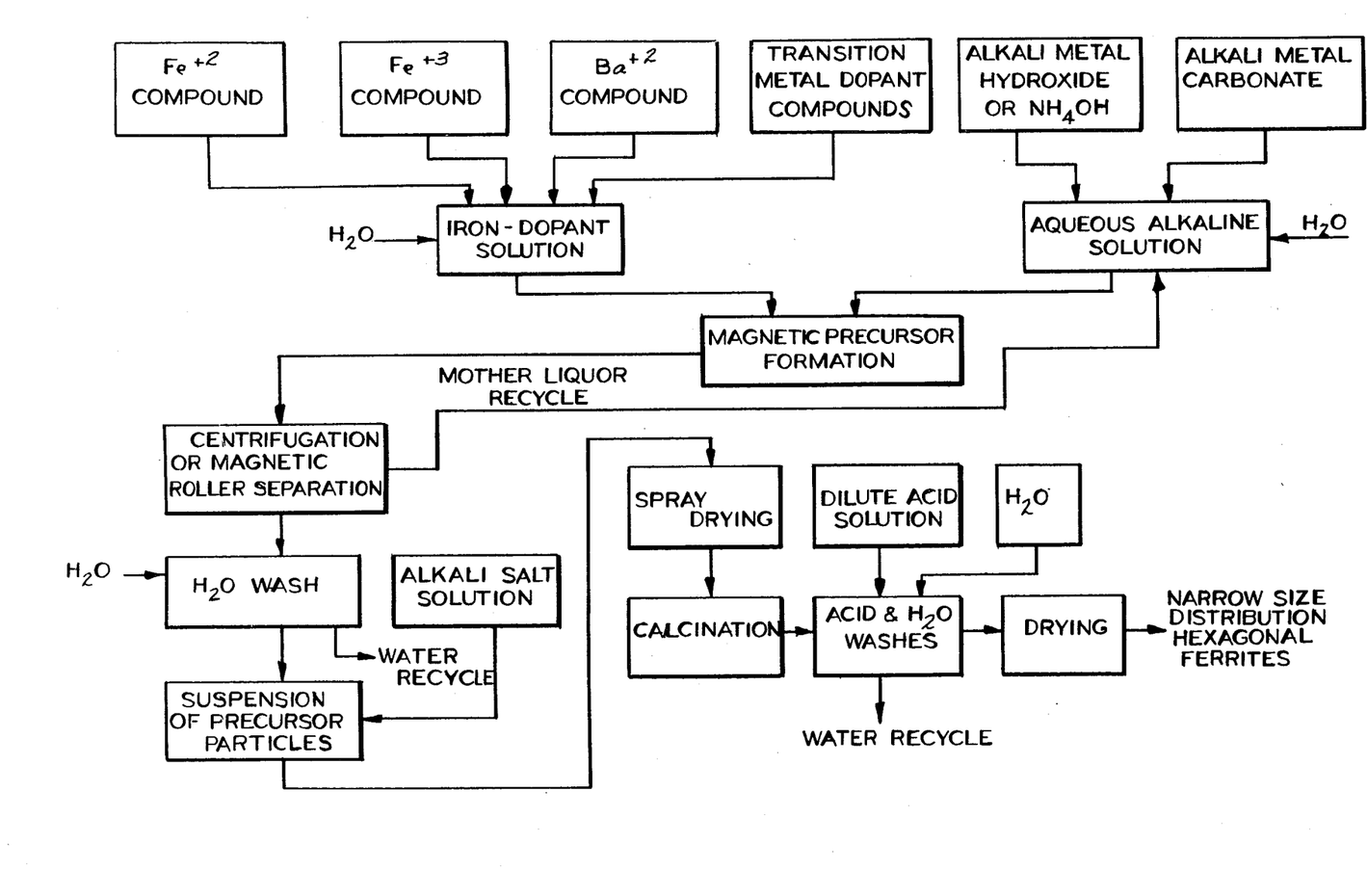
The FIGURE is a flow chart of a preferred embodiment of the present invention wherein doped barium hexaferrite particles are made.

As can be seen from the FIGURE, the present invention encompasses a multi-step process. This process will be described in detail below in terms of the most preferred embodiment, namely making cobalt- and titanium-doped barium hexaferrite particles of the formula $BaFe_{12-r-s}Co_rTi_sO_{19}$. Of course, the other embodiments of the present invention may be carried out following the example of this most preferred embodiment.

This multi-step process preferably starts with separately forming an aqueous iron-dopant solution and an aqueous alkaline solution.

The aqueous iron-dopant solution is formed by mixing a ferric compound (e.g., $FeCl_3$), a ferrous compound (e.g., $FeCl_2$), a barium compound (e.g., $BaCl_2$) and the above-noted metal dopant compounds in water. This solution is preferably made at room temperature (20°–25° C.). Halide salts are preferred with the chlorine salts most preferred. Hydrates of these salts may also be used. The preferred and most preferred percentages (by weight of solids) of each component when making $BaFe_{10.2}Co_{.9}Ti_{.9}O_{19}$ in this solution is as follows:

| Component | Preferred Range | More Preferred Range |
|---|---|---|
| $BaCl_2$ | 0.21–3.34% | 0.47–2.29% |
| $FeCl_2$ | 0.43–6.90 | 0.97–4.75 |
| $FeCl_3$ | 1.10–17.67 | 2.48–12.15 |
| $CoCl_2$ | 0.12–1.87 | 0.26–1.29 |
| $TiCl_3$ | 0.14–2.22 | 0.31–1.53 |
| Water | 98–68 | 95.5–78 |

In some instances, it may be desirable to mix these ingredients in water before mixing them into the iron-dopant solution. For most applications the cobalt and titanium are added in substantially equimolar amounts in order to achieve electrical neutrality (i.e. r=s). When cobalt and titanium are the dopant pair, r and s are most preferably the same value in the range from about 0.6 to 1.0. Nickel or zinc compounds may be substituted for cobalt components when cobalt is not readily available. Ruthenium has been found as part of the present invention to provide equivalent results to titanium dopants, but at lower dopant concentrations.

The aqueous alkaline solution is preferably made by adding to water an alkali metal carbonate, either alone or in combination with an alkali metal hydroxide. The preferred alkali metal cation for both the carbonate and the hydroxide is sodium. The amount of total alkali compounds (i.e. both hydroxides and carbonates) should preferably be at least about 10% molar excess, more preferably about 20% to about 100% molar excess, of that needed to precipitate all of the solids in the iron-dopant solution. The minimum amount of carbonate ions to be employed is preferably at least 10% molar excess over the molar amount of barium ions in the iron-dopant solution. The remainder of the alkali may be either carbonate alone, or a combination of carbonate and hydroxide, in an amount sufficient to precipitate the other constituents of the iron-dopant solution. The pH of the aqueous alkaline solution will be generally in the range of from about 10 to about 14. Alternatively, it may be desirable to form the alkali metal carbonate in situ by adding $CO_2$ gas to a solution containing excess NaOH. It is preferred that the aqueous alkaline solution is heated from about 40° C. to about 100° C. to facilitate the co-precipitation reaction in the following step.

The above-mentioned iron-dopant solution aqueous alkaline solution are admixed together to form a co-precipitate of cobalt- and titanium-doped $Fe_3O_4$/$BaCO_3$ particles in an aqueous alkaline mother liquor. Suitable volume ratios of the iron-dopant solution to the aqueous alkaline solution for admixture are from about 1:5 to about 1:0.5. These co-precipitated precursors are submicron size particles generally having a nearly uniform average particle size in the range from about 0.005 to about 0.05 microns. The amount of barium, iron and dopants contained in these precursor co-precipitates are in the mole ratio desired for the final product. The co-precipitated particles are magnetic due to the formation of $Fe_3O_4$ (magnetite) from the combined $Fe^{+2}$ and $Fe^{+3}$ addition.

This admixing step preferably occurs at a temperature from about 40° C. to about 130° C., more preferably, from about 90'° C. to about 120°C. This admixing step may be carried out with conventional liquid/liquid mixing apparatus such as a continuous stirred tank reactor (CSTR), batch tank reactor or a plug flow type reactor. The preferred mode of admixing in a large-scale system is a CSTR equipped with an external steam jacket. The preferred admixing mode is to add the iron-dopant solution into the aqueous alkaline solution.

The formed co-precipitated precursor particles are then separated from the aqueous alkaline mother liquor. It has been found that centrifugation is the preferred separation method. Any conventional centrifugation method may be used including basket, disk and scroll methods. Alternatively, it has been found that a magnetic roller separator is effective. If centrifugation is employed, less mother liquor is left in the wet cake than the magnetic roll separator. Filtration may alternatively be used but is not favored because the lengthy time required for separation to occur. In any case, the separated mother liquor may be recycled back to form more of the above-noted aqueous alkaline solution.

As seen in the FIGURE, it is next preferred to wash the separated crystals with $H_2O$ to reduce the residual total alkaline content (i.e. carbonate and hydroxide amounts) in the precursor particle cake. After washing, acceptable residual alkaline content of the cake may be from about 0.01% to 2% by weight of the cake.

The co-precipitate cake is then suspended in a concentrated (i.e. at least about 15% by weight) aqueous solution of an alkali halide (e.g. alkali metal halides such as NaCl or KCl or alkaline earth metal halides such as $BaCl_2$). The preferred alkali halide salt solution is preferably a saturated aqueous solution to reduce the water content during the following spray drying step. The weight ratio of the co-precipitated particles to alkali halide salt solids is preferably from about 1:1 to about 1:9, more preferably from about 1:1.15 to about 1:3, on a solid weight basis. The preferred alkali halide salt is NaCl because its sodium anions and chloride anions match the sodium and chloride ions used in the preferred reactants and thus avoids mixing anions and cations which may be difficult to separate and recycle. This alkali halide salt keeps the co-precipitated particles in suspension and appears to counteract the magnetic attraction forces between these particles. The suspension may be formed by any conventional solids/liquid mixing apparatus such as dispersers, homogenizers, ultrasonicators, high speed turbine-type mixers or other high shear mixing apparatus.

The formed suspension is then spray dried to produce a dry powder. The co-precipitated $Fe_3O_4$/$BaCO_3$ particles preferably comprises about 2-50% of the powder, more preferably, from 25%-45% by weight of the powder. The alkali halide salt makes up the balance. This dry powder is generally made up of hollow spherical particles having a 5-100 micron average particle size, preferably 10-50 microns, where the co-precipitated particles are distributed throughout in small clusters on the surfaces of the alkali halide crystals. This distribution keeps substantially all of the magnetic co-precipitated particles separated from each other so as to not undesirably form large clusters of sintered particles during calcination.

The spray dried powder is then calcined at temperatures from about 700° C. to about 900° C. The specific calcination temperature should be below the melting point of the alkali halide chosen. When NaCl is the alkali halide salt employed in suspending the precipitate, the most preferred temperatures are from about 750° C. to about 790° C. The calcination time will mainly depend upon the exact temperature used and the alkali salt employed. Preferred times range from 0.25 hours to 5 hours. During calcination, the small clusters of magnetic co-precipitated particles on alkali halide salt crystals react and fuse together to form small individual hexaferrite crystals. The alkali halide crystals thus provide the substrate on which these hexaferrite crystals grow. And, therefore, formed hexaferrite particles have a larger average particle size than $Fe_3O_4$/$BaCO_3$ precursor particles.

Any conventional calcination method may be used. Standard tray calciners and rotary tube calciners (either gas-fired or electric) may be used. An oxygen or air sweep during calcination is preferred to remove the $CO_2$ gas produced as a by-product and promote oxidation of the $Fe_3O_4$ component of the co-precipitate into the final hexaferrite product.

The calcined hexaferrite product may be recovered from the alkali halide salt by any conventional means. It is preferred to first cool the calcined product followed by dilute acid-washing (e.g. HCl) to dissolve and separate the alkali halide salt and any remaining unreacted carbonate or other acid-soluble impurities from the hexaferrite product. A suitable dilute acid solution would be 0.25%-5% by weight HCl in water. The acid-washing may be followed by water-washes to remove any residual acid or salt. Finally, the washed hexaferrite product may be dried by conventional drying equipment (e.g. convection ovens, vacuum dryers or rotary dryers) at 100°-250° C. to produce a dried product. With some drying equipment (e.g. tray driers) loose lumps of hexaferrite particles are formed. These lumps may be broken up by a pinmill delumper to the desired mesh size. This delumping operation is not a severe milling process like the ball milling and the like used in the prior art processes to break up hard sintered particles.

The process of the present invention results in a finely divided, non-sintered hexaferrite particles of the platelet type. These particles have little or no crystal defects. The average particle diameter of these particles may range from about 0.01 to about 0.3 microns, preferably from about 0.03 to about 0.1 microns. Average particle size may be finally adjusted by slightly varying the above-noted process parameters such as the ratio of co-precipitate to alkali halide salt and calcination temperature and time. The particles also generally will have a narrow particle size distribution with over 95% of the particles within the range of 0.01-0.2 microns. Aspect ratios of these particles may be from about 2:1 to about 10:1. The specific surface area (BET) accordingly would vary from 15 m²/g to about 42 m²/g.

The hexagonal ferrite particles also generally have excellent specific magnetization values in the range from about 50 to 60 emu/g or higher. They also usually have high remanence magnetization (Br) values in the range from about 18-26 emu/g. The coercivity ($H_c$) values generally are from about 350-1100 Oe. These physical and chemical properties are suitable for most high density magnetic recording applications. Moreover, small adjustments in these physical and chemical properties may be easily accomplished by making small variations in the process parameters of the present invention. For example, the magnetization values may be slightly changed by varying the calcination time, particle size, particle shape and amount and type of dopants. Particle coercivity may be slightly altered by slight changes in average particle size of the precursor particles or by slightly varying the particle aspect ratio and amount or type of dopants.

Moreover, the hexaferrite products obtained by this process are free-flowing and possess excellent dispersibility on magnetic recording media substrates. The doped barium ferrite particles produced by the process of the present invention may be incorporated into magnetic recording media substrates by means of any conventional thermoplastic, or any conventional thermosettable, or any conventional elastomeric binder utilizing conventional coating processes. Alternatively, these doped barium ferrite particles may be formed on a substrate as a film or the like by a sputtering process, a vacuum deposition process or other conventional deposition processes which do not require binders.

The following Examples are provided to better illustrate this invention. All parts and percentages are by weight unless explicitly stated otherwise.

EXAMPLE 1

The preparation of a $BaFe_{10.28}Co_{.86}Ti_{.86}O_{19}$ product was carried out using a 30 liter continuous stirred tank reactor (CSTR) for precursor formation and a continuous rotary calciner for hexaferrite formation.

A iron-dopant feed solution was prepared by mixing the following solids and aqueous solutions into deionized water:

| | Iron-Dopant Components | | |
| Component | Total Kg | Wt. % Assay | Reactant Moles |
| --- | --- | --- | --- |
| FeCl₃ Solution | 43.540 | 38.30 | 102.80 |
| FeCl₂ Solution | 22.350 | 29.15 | 51.40 |
| CoCl₂·6H₂O Crystal | 3.069 | — | 12.90 |
| TiCl₃ Solution | 7.770 | 25.60 | 12.90 |
| BaCl₂·2H₂O Crystal (2% Excess BaCl₂) | 3.737 | — | 15.30 |

These components were diluted and mixed with sufficient deionized water to form a total solution volume of 160 gallons (605.6 liters).

An aqueous NaOH/Na₂CO₃ alkaline solution was also prepared by mixing the following components in deionized water:

| Aqueous Alkaline Components | | | |
|---|---|---|---|
| Component | Total Kg | Wt. % Assay | Reactant Moles |
| 50% NaOH Solution | 85.18 | 50 | 1064.75 |
| Na$_2$CO$_3$ Anhydrous | 12.81 | — | 120.84 |

These components were diluted and mixed with deionized water to form a total solution volume of 450 gallons (1703 liters).

After its formation, the aqueous alkaline solution was heated to a temperature of 90°–95° C. using a steam heated shell and tube heat exchanger. The hot (90°–95° C.) alkaline solution and room temperature iron-dopant solution (~25° C.) were then pumped into a steam jacketed continuous stirred tank reactor with overflow at the following conditions.

| | |
|---|---|
| alkaline flowrate | 1.33 GPM (5.03 LPM) |
| iron-dopant flowrate | 0.68 GPM (2.57 LPM) |
| agitator RPM | 1100 |
| reactor temperature | 96–98° C. |
| reactor volume | 7.92 gallons (30 liters) |
| reactor residence time | 4 minutes |
| baffles | 4 |
| agitator type | one 5.9 inch Lightning A-310 impeller |

This CSTR reactor was designed to insure adequate mixing of the two solution streams to form the magnetic precursor co-precipitate particles. The alkaline solution flowed into the reactor by an upflow from the bottom. The iron-dopant solution was introduced into the reactor through pin-holes in a circular sparger ring positioned below the impeller. The reactor overflow was positioned near the top of the reactor.

The continuous output from the reactor overflow was sent into a recirculating quench tank to cool this output reactor stream to below about 40° C. and thereby reduce any further precursor particle growth. Cooling was done using a water cooled heat exchanger.

The cooled precursor solution was then passed from the quench tank to a settling tank. The precursor co-precipitate particles settled to the bottom and a portion of the clear alkaline supernatant was decanted to form a slurry of about 100 gal. The slurry was then washed with an additional 300 gallons of deionized water.

The washed precursor slurry was then centrifuged using a 12 inch imperforate bowl basket centrifuge with a G-force of about 1500. This step separated out 95 pounds of a wet cake (33% by weight total precursor solids having 0.06% by weight total alkali impurities). This wet cake then suspended in 360 pounds of saturated 25% by weight NaCl solution using a high speed homogenizer. The precursor/brine slurry was then spray dried in a Bowen BLSA direct gas fired spray dryer at the following conditions:

| | |
|---|---|
| inlet temperature | 500° C. |
| outlet temperature | 260° C. |
| atomizer | centrifugal disk type AT-4 (40,000 RPM) |
| collection | cyclone and baghouse |

The recovered spray dried powder (~120 pounds) was brown in color and contained 25% by weight precursor and 75% NaCl.

The spray dried powder was then screw fed into a gas fired rotary calciner and calcined at the following conditions:

| | |
|---|---|
| temperature | 775–790° C. |
| countercurrent air flowrate | 30 LPM |
| residence time | 2.5–3.0 hours |
| tube construction | type 309 stainless |
| bed volume | approximately 10% |
| tube diameter | 6½ inches |
| heated tube length | 72 inches |
| cooling zone | 18 inches |

The recovered calcined powder (~100 pounds) was mixed with agitation with 30 gallons of water containing 0.5 wt. % HCl for one-half hour. The solids were then settled and supernate decanted. This was followed by and supernate decanted. This was followed by additional deionized water washings. After the last water washing, the solids were centrifuged in the previously noted basket centrifuge to get a 40–45 wt. % product cake.

The product cake was then placed in trays and dried in a convection type laboratory batch oven dryer for 18–24 hours. The product cake was then delumped to a powder size of less than 100 mesh and yielded about 23 pounds of final product.

Final magnetic and physical properties of this Co-Ti doped barium hexaferrite product powder were as follows:

| | |
|---|---|
| specific magnetization (at 10K Oe) | 53 emu/gram |
| coercivity (H$_c$) | 800 Oe |
| average particle diameter | .047 microns |
| aspect ratio average | 3:1 |
| BET specific surface area | 23.3 m$^2$/gram |
| total particle size range | 0.01–0.14 microns |
| 95% by number particle size range | .01–0.10 microns |

EXAMPLE 2

Batch Preparation of BaFe$_{10.5}$Co$_{.75}$Ti$_{.75}$O$_{19}$

Solution A (iron-dopant solution) was prepared by dissolving the following components in 500 ml of deionized H$_2$O:

| Component | Weight |
|---|---|
| FeCl$_3$.6H$_2$O | 23.651 gm |
| FeCl$_2$.4H$_2$O | 8.698 gm |
| BaCl$_2$.2H$_2$O | 3.053 gm |
| CoCl$_2$.6H$_2$O | 2.230 gm |
| Ti metal dissolved in conc. HCl | 0.449 gm (excluding HCl) |

The TiCl$_3$ was added last to the dissolved salts.

Solution B was prepared by mixing 60 gm of 50 wt. % NaOH in 500 ml of N$_2$ purged deionized H$_2$O. Solution C was prepared by dissolving 10 gm of Na$_2$CO$_3$ in 500 ml of deionized H$_2$O.

Solutions B and C were mixed in a 1500 ml beaker to form an aqueous alkaline solution.

The beaker was then put on a hot plate equipped with a stirrer and heated to a temperature of 90° C. Solution A was slowly added to the stirred and heated B plus C solution over a 5 minute period. During addition, temperature of the combined solutions dropped to 75° C. Formation of a black magnetic precipitate was noted during the addition of solution A to solution B plus C.

After this addition period, the resulting solution mixture was maintained at 95° C. to 100° C. for a period of 30 minutes.

The solution then was removed from the heat and placed on a plate magnet to increase the settling rate of the magnetic precursor co-precipitate particles. The supernatant was decanted and the separated precursor particles were washed 3 times with deionized H$_2$O.

The washed precursor particles were then centrifuged to remove residual water. The resultant precursor particle cake (44.46 gm) was suspended in 153.59 gm of an aqueous NaCl solution (25 wt. %) with a high speed blender.

The resultant precursor/NaCl suspension was then spray dried using a two-fluid spray nozzle (Model 600-1 manufactured by Heat Systems-Ultrasonics, Inc. located in Farmingdale, N.Y.) to form a very fine, 10–15 micron-sized powder.

About 9.5 gm of the spray dried powder was put in a platinum crucible and calcined in a laboratory furnace at 760° C. for one hour. 9.046 Grams of material was recovered after calcining and cooling to room temperature. This product was then washed in deionized H$_2$O three times to remove the NaCl and then dried in an oven at 150° C. 2.424 Grams of magnetic brown product was recovered. This product was then washed in a 2.5 weight % HCl solution for 5 minutes, then water rinsed again three times and dried again at 150° C. The final doped barium hexaferrite product had a weight of 2.108 gm.

The product had a specific magnetization $\delta_s$ of 54.4 emu/gm at 10K Oe with remanence magnetization $B_r$ of 24.1 emu/gm and coercivity Hc of 680 Oe. The product consisted of hexagonal-shaped platelets with a total particle size distribution range of 0.01–0.15 microns, with an average particle size of about 0.05 microns. The particle diameter to thickness ratio ranged between 3:1 to 5:1. Ninety-five percent of the particles were in the size range of 0.01–0.09 microns. BET specific surface area was 36.4 m$^2$ gm.

EXAMPLE 3

Batch Preparation of BaFe$_{11.2}$Ni$_{.40}$Ru$_{.40}$O$_{19}$

Solution A (iron-dopant solution) was prepared by dissolving the following components in 500 ml of deionized H$_2$O.

| Component | Weight |
| --- | --- |
| FeCl$_3$.6H$_2$O | 25.219 gm |
| FeCl$_2$.4H$_2$O | 9.277 gm |
| BaCl$_2$.2H$_2$O | 3.054 gm |
| RuCl$_3$.3H$_2$O | 1.307 gm |
| NiCl$_2$.6H$_2$O | 1.189 gm |

The RuCl$_3$ solution was added last in the mixture. The pH of the solution was 1.35.

Solutions B and C were prepared the same as in Example 2. The B plus C solution was then heated, solution A was then added thereto, and the aqueous alkaline solution combination heated thereafter as in Example 2.

The black magnetic precursor co-precipitated particles were then separated from the supernatant, washed with deionized H$_2$O, and centrifuged. 47.66 Grams of the washed particles were then mixed with 215.00 gm of aqueous NaCl solution (25% by wt.) and dispersed in a high speed blender. The precursor/NaCl solution was then spray dried in the same apparatus as in Example 2.

10.710 Grams of a spray dried powder was obtained, which was then calcined at 760° C. for one hour. The calcined powder weighed 10.265 gm. After salt removal and dryings by the same procedure as in Example 2, the final product was recovered and weighed 1.793 gm. This dark brown magnetic material had a $\delta_s$ of 58.2 emu/gm at 10K Oe with a $B_r$ of 26.0 emu/gm and H$_c$ of 475 Oe. Particle size range was 0.01–0.18 microns with an average size of 0.05 microns. Ninety-five percent of the particles were in the size range of 0.01–0.11 microns. BET specific surface area was 38.0 m$^2$/gm. Average aspect ratio was about 5:1.

EXAMPLE 4

Batch Preparation of BaFe$_{11.5}$Co$_{.25}$Ru$_{.25}$O$_{19}$

The preparation of this doped barium hexaferrite product was the same as in Example 2 except that Ru was used in place of Ti in the preparation. Solution A was prepared by dissolving the following components in 500 ml of deionized H$_2$O.

| Component | Weight |
| --- | --- |
| FeCl$_3$.6H$_2$O | 25.890 gm |
| FeCl$_2$.4H$_2$O | 9.526 gm |
| BaCl$_2$.2H$_2$O | 3.054 gm |
| RuCl$_3$.3H$_2$O | 0.818 gm |
| CoCl$_2$.6H$_2$O | .745 gm |

The final product weighed 2.507 gm. This dark brown product had a $\delta_s$ of 55.6 emu/gm at 10K Oe with a $B_r$ of 25.7 emu/gm and H$_c$ of 710 Oe. Particle size distribution was 0.01–0.20 microns with an average particle size of about 0.06 microns. Ninety-five percent of the particles were in the size distribution of 0.01–0.15 microns. BET specific surface area was 40.4 m$^2$/gm. Average aspect ratio was about 6:1 to 8:1.

EXAMPLE 5

Batch Preparation of BaFe$_{10.4}$Co$_{.60}$Zn$_{.20}$Ti$_{.80}$O$_{19}$

The preparation of this doped barium hexaferrite product was the same as the process described in Example 2 except that a combination of cobalt and zinc were used instead of cobalt alone. Solution A was prepared by dissolving the following components in 500 ml of deionized H$_2$O.

| Component | Weight |
| --- | --- |
| FeCl$_3$.6H$_2$O | 23.427 gm |
| FeCl$_2$.4H$_2$O | 8.615 gm |
| BaCl$_2$.2H$_2$O | 3.420 gm (10.7% by wt excess) |
| CoCl$_2$.6H$_2$O | 1.784 gm |
| ZnCl$_2$ | 0.341 gm |
| Ti metal dissolved in conc. HCl | 0.479 gm (excluding HCl) |

The final product weighed 3.375 gm. This dark brown product had a $\delta_s$ of 52.9 emu/gm at 10K Oe with a $B_r$ of 20.9 emu/gm and H$_c$ of 570 Oe. Particle size diameter range was 0.01–0.15 microns with an average particle diameter size of 0.05 microns. Ninety-five percent of the particles were in the size range of 0.01–0.10 microns. BET specific surface area was 37.2 m$^2$/gm. Average aspect ratio was about 6:1.

EXAMPLE 6

Batch Preparation of BaFe$_{11.2}$Co$_{.30}$Zn$_{.10}$Ru$_{.40}$O$_{19}$

The preparation of this doped barium hexaferrite product was the same as the process of Example 2 except that the combination of cobalt and zinc was used instead of cobalt alone and ruthenium was used instead of titanium. Solution A was prepared by dissolving the following compounds in 500 ml of nitrogen purged deionized H$_2$O.

| Component | Weight | |
|---|---|---|
| FeCl$_3$.6H$_2$O | 25.227 gm | |
| FeCl$_2$.4H$_2$O | 9.277 gm | |
| BaCl$_2$.2H$_2$O | 3.420 gm | (10.7% by wt. excess) |
| CoCl$_2$.6H$_2$O | 1.892 gm | |
| ZnCl$_2$ | 0.170 gm | |
| RuCl$_3$.3H$_2$O | 1.307 gm | |

The final product weighed 2.550 gm. This dark brown product had a $\delta_s$ of 57.7 emu/gm at 10K Oe with a B$_r$ of 24.8 emu/gm and H$_c$ of 394 Oe. Particle diameter size range was 0.01–0.18 microns with an average particle diameter size of 0.055 microns. Ninety-five percent of the particles were in the size range of 0.01–0.12 microns. BET specific surface area was 33.3 m$^2$/gm. Average aspect ratio was about 6:1.

What is claimed is:

1. A process for preparing doped barium and strontium hexaferrite compounds having the formula (I):

$$AFe_{12-r-s}M_rN_sO_{19} \quad (I)$$

wherein A is barium or strontium; M is cobalt, zinc, nickel or a mixture thereof; N is titanium or ruthenium or a mixture thereof; and r and s are individually selected from about 0.1 to about 1.2, said process comprising:
   (a) forming particles of a doped Fe$_3$O$_4$/ACO$_3$ coprecipitate wherein A is defined above from (i) a ferric compound, (ii) a ferrous compound, (iii) a barium or strontium compound, (iv) a cobalt, zinc or nickel compound or a mixture thereof, (v) a titanium or ruthenium compound or a mixture thereof and (vi) alkali metal carbonate, said relative amounts of (i) and (ii) sufficient to form Fe$_3$O$_4$;
   (b) suspending the doped Fe$_3$O$_4$/ACO$_3$ particles in a concentrated aqueous solution of an alkali halide;
   (c) spray drying said suspension to form a dried powder comprising said doped Fe$_3$O$_4$/ACO$_3$ particles distributed onto the surfaces of said alkali halide crystals;
   (d) calcining said dried powder at a temperature from about 700° C. to about 900° C. and below the melting point of said alkali halide to convert said Fe$_3$O$_4$/ACO$_3$ solids into doped hexaferrite particles having formula (I) and an average particle size from about 0.01 to about 0.3 microns; and
   (e) recovering said doped hexaferrite particles from said alkali halide.

2. The process of claim 1 wherein step (a) ferric compound is a ferric halide and said ferrous compound is a ferrous halide.

3. The process of claim 2 wherein said ferric halide is ferric chloride and said ferrous halide is ferrous chloride.

4. The process of claim 3 wherein step (a) said alkali metal carbonate is sodium carbonate and step (b) said alkali halide is sodium chloride.

5. The process of claim 4 wherein sodium hydroxide is additionally present in step (a).

6. The process of claim 5 wherein said calcination step (d) is carried out at a temperature from about 750°C. to about 790° C.

7. The process of claim 1 wherein M is cobalt and N is titanium.

8. The process of claim 7 wherein x and y are individually selected from about 0.6 to about 1.2.

9. The process of claim 8 wherein x and y are the same.

10. The process of claim 1 wherein the average particle size of the formed hexaferrite compounds is from about 0.03 microns to about 0.1 microns.

11. A process for preparing doped barium and strontium hexaferrite particles having the formula (I):

$$AFe_{12-r-s}M_rN_sO_{19} \quad (I)$$

wherein A is barium or strontium; M is cobalt, zinc, nickel or a mixture thereof; N is titanium or ruthenium or a mixture thereof; and r and s are individually selected from about 0.1 to about 1.2, said process comprising:
   (a) forming an aqueous iron-dopant solution comprising (i) a ferric compound, (ii) a ferrous compound, (iii) a barium or strontium compound, (iv) a cobalt, zinc or nickel compound or mixture thereof and (v) a titanium or ruthenium compound or a mixture thereof, said relative amounts of (i) and (ii) sufficient to form Fe$_3$O$_4$;
   (b) forming an aqueous alkaline solution comprising an alkali metal carbonate and, optionally, an alkali metal hydroxide;
   (c) admixing said solution of step (a) with said solution of step (b) to form a reaction mixture comprising doped Fe$_3$O$_4$/ACO$_3$ co-precipitated particles in an aqueous alkline mother liquor wherein A is defined above;
   (d) separating the precipitated doped Fe$_3$O$_4$/ACO$_3$ solids from said mother liquor;
   (e) suspending the precipitated doped Fe$_3$O$_4$/ACO$_3$ particles in a concentrated aqueous solution of an alkali halide;
   (f) spray drying said suspension to form a dried powder comprising said doped Fe$_3$O$_4$/ACO$_3$ particles distributed onto the surfaces of said alkali halide crystals;
   (g) calcining said dried powder at a temperature from about 700° C. to about 900° C. and below the melting temperature of said alkali halide to convert said Fe$_3$O$_4$/ACO$_3$ particles into doped hexaferrite particles having formula (I) and an average particle size from about 0.01 to about 0.3 microns; and
   (h) recovering said doped hexaferrite particles from said alkali halide.

12. The process of claim 11 wherein step (a) said ferric compound is a ferric halide and said ferrous compound is a ferrous halide and A is barium.

13. The process of claim 12 wherein said ferric halide is ferric chloride, said ferrous halide is ferrous chloride and said barium compound is barium chloride.

14. The process of claim 13 wherein step (b) said alkali metal hydroxide is sodium hydroxide and said alkali metal carbonate is sodium carbonate.

15. The process of claim 14 wherein step (e) said alkali halide is sodium chloride.

16. The process of claim 15 wherein said calcinating step (g) is carried out at a temperature from about 750° to about 790° C.

17. A process for preparing a cobalt- and titanium-doped barium hexaferrite compound having the formula (I):

$$Ba_2Fe_{12-r-s}Co_rTi_sO_{19}$$

wherein r and s are individually selected from 0.6 to 1.2, said process comprising:
(a) forming an aqueous iron-dopant solution comprising ferric chloride, ferrous chloride, barium chloride, cobalt chloride and titanium chloride;
(b) forming an aqueous alkaline solution comprising sodium hydroxide and sodium carbonate;
(c) admixing said solution of step (a) with said solution of step (b) to form a reaction mixture comprising cobalt- and titanium-doped $Fe_3O_4/BaCO_3$ co-precipitated particles in a hydroxide/carbonate mother liquor;
(d) separating said precipitated doped $Fe_3O_4/BaCO_3$ solids from said mother liquor;
(e) suspending said precipitated doped $Fe_3O_4/BaCO_3$ solids in a saturated aqueous solution of sodium chloride;
(f) spray drying said suspension to form a dried powder comprising said doped $Fe_3O_4/BaCO_3$ solids distributed on the surfaces of the sodium chloride crystals;
(g) calcining said dried powder at a temperature from about 750° C. to about 790° C. to convert said $Fe_3O_4/BaCO_3$ solids into cobalt- and titanium-doped barium hexaferrite particles and an average particle size from about 0.03 to about 0.1 microns; and
(h) recovering said cobalt- and titanium-doped barium hexaferrite particles from said alkali halide.

18. The process of claim 17 wherein r equals s.

19. A process for preparing a dry admixture of double-doped $Fe_3O_4/ACO_3$ particles with alkali halide crystals; wherein A is barium or strontium, one dopant is cobalt, zinc or nickel or a mixture thereof, and the second dopant is titanium or ruthenium or a mixture thereof; said process comprising the steps:
(a) suspending said doped $Fe_3O_4/ACO_3$ particles in a concentrated aqueous solution of said alkali halide; and
(b) spray drying the resulting suspension to form a dry powdered product in which particles of said doped $Fe_3O_4/ACO_3$ are distributed in clusters on the surface of said alkali halide crystals.

20. The process of claim 19 wherein A is barium.

21. The process of claim 19 wherein said alkali halide is a chloride.

22. The process of claim 21 wherein said alkali chloride is sodium chloride.

23. The process of claim 19 wherein said doped $Fe_3O_4/ACO_3$ particles have an average particle size from about 0.005 to about 0.05 microns.

24. The process of claim 19 wherein the weight ratio of solid doped $Fe_3O_4/ACO_3$ particles to alkali halide salt solids is from about 1:1 to about 1:9 on a solid weight basis.

25. The process of claim 24 wherein said weight ratio is from about 1:1.15 to about 1:3 on a solid weight basis.

26. The process of claim 19 wherein said dry powdered product has an average particles size from 5 to 100 microns.

27. A dry powder comprising an admixture of double-doped $Fe_3O_4/ACO_3$ particles with alkali halide salt crystals, wherein A is barium or strontium and one dopant is cobalt, zinc or nickel or a mixture thereof and the second dopant is titanium or ruthenium or a mixture thereof and wherein said doped $Fe_3O_4/ACO_3$ particles are distributed in clusters on the surfaces of said alkali halide crystals.

28. The dry powder of claim 27 wherein A is barium.

29. The dry powder of claim 27 wherein said alkali halide is a chloride.

30. The process of claim 29 wherein said alkali chloride is sodium chloride.

31. The process of claim 27 wherein said doped $Fe_3O_4/ACO_3$ particles have an average particle size from about 0.005 to about 0.05 microns.

32. The dry powder of claim 27 wherein the weight ratio of solid doped $Fe_3O_4/ACO_3$ particles to alkali halide salt solids is from about 1:1 to about 1:9 on a solid weight basis.

33. The dry powder of claim 32 wherein said weight ratio is from about 1:1.15 to about 1:3 on a solid weight basis.

34. The dry powder of claim 27 wherein said dry powdered product has an average particles size from 5 to 100 microns.

* * * * *

UNITED STATES PATENT AND TRADEMARK OFFICE
CERTIFICATE OF CORRECTION

PATENT NO. : 4,781,852

DATED : November 1, 1988

INVENTOR(S) : Jerry J. Kaczur, J. Paul Deininger and Larry D. Carpenter

It is certified that error appears in the above—identified patent and that said Letters Patent is hereby corrected as shown below:

In Column 16, line 36, after the word "The", delete "process" and insert --dry powder--.

In Column 16, line 38, after the word "The", delete "process" and insert --dry powder--.

Signed and Sealed this

Fifth Day of May, 1992

Attest:

DOUGLAS B. COMER

Attesting Officer

Acting Commissioner of Patents and Trademarks